US 12,299,966 B2

(12) United States Patent
Yamada et al.

(10) Patent No.: US 12,299,966 B2
(45) Date of Patent: May 13, 2025

(54) INFORMATION PROCESSING APPARATUS, INFORMATION PROCESSING METHOD, NON-TRANSITORY COMPUTER-READABLE STORAGE MEDIUM STORING PROGRAM, AND SYSTEM

(71) Applicant: CANON KABUSHIKI KAISHA, Tokyo (JP)

(72) Inventors: Takayuki Yamada, Kanagawa (JP); Shinjiro Hori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 17/846,161

(22) Filed: Jun. 22, 2022

(65) Prior Publication Data

US 2022/0415025 A1 Dec. 29, 2022

(30) Foreign Application Priority Data

Jun. 29, 2021 (JP) ................................. 2021-107823

(51) Int. Cl.
*G06V 10/776* (2022.01)
*G06T 7/12* (2017.01)
(Continued)

(52) U.S. Cl.
CPC .............. *G06V 10/776* (2022.01); *G06T 7/12* (2017.01); *G06V 10/22* (2022.01); *G06V 10/778* (2022.01); *G06V 10/82* (2022.01); *G06V 20/70* (2022.01); *G06T 2207/20021* (2013.01); *G06T 2207/20076* (2013.01); *G06T 2207/20081* (2013.01); *G06T 2207/20084* (2013.01)

(58) Field of Classification Search
CPC ............. G06T 7/12; G06T 2207/20081; G06T 2207/20084; G06V 10/82; G06V 10/26; G06N 3/0464; G06N 3/09
See application file for complete search history.

(56) References Cited

U.S. PATENT DOCUMENTS 8,620,105 B2  12/2013  Hori et al.
9,052,742 B2   6/2015  Hori et al.
(Continued)

FOREIGN PATENT DOCUMENTS

CN   112419343 A  *  2/2021  ........... A61B 5/0044
CN   113160261 B  * 11/2022  ........... G06N 3/0454
(Continued)

OTHER PUBLICATIONS

Ronneberger et al., "U-Net: Convolutional Networks for Biomedical Image Segmentation", Medical Image Computing and Computer-Assisted Intervention (MICCAI) 2015, pp. 234-241.
(Continued)

*Primary Examiner* — Ted W Barnes
(74) *Attorney, Agent, or Firm* — Venable LLP

(57) ABSTRACT

A calculation unit calculates a first error for a boundary region of an image represented by image data, calculates a second error for a non-boundary region different from the boundary region, and calculates an error between label data and an estimation result based on the first error and the second error. And an influence of the first error on the calculation by the calculation unit is controlled to be smaller than an influence of the second error on the calculation by the calculation unit.

20 Claims, 12 Drawing Sheets

(51) Int. Cl.
  *G06V 10/22* (2022.01)
  *G06V 10/778* (2022.01)
  *G06V 10/82* (2022.01)
  *G06V 20/70* (2022.01)

(56) References Cited

U.S. PATENT DOCUMENTS

| | | | |
|---|---|---|---|
| 9,704,221 | B2 | 7/2017 | Hori et al. |
| 9,769,352 | B2 | 9/2017 | Yanai et al. |
| 10,482,603 | B1 * | 11/2019 | Fu .............................. G06N 3/04 |
| 10,551,845 | B1 * | 2/2020 | Kim ........................ G06N 5/046 |
| 10,699,400 | B2 | 6/2020 | Hori et al. |
| 10,726,539 | B2 | 7/2020 | Hori et al. |
| 10,740,641 | B2 | 8/2020 | Iguchi et al. |
| 10,742,823 | B2 | 8/2020 | Iguchi et al. |
| 10,796,405 | B2 | 10/2020 | Kunieda et al. |
| 10,958,796 | B2 | 3/2021 | Obayashi et al. |
| 11,074,734 | B2 | 7/2021 | Kunieda et al. |
| 11,089,170 | B2 | 8/2021 | Kunieda et al. |
| 11,140,277 | B2 | 10/2021 | Yamada et al. |
| 11,218,603 | B2 | 1/2022 | Kunieda et al. |
| 11,361,487 | B2 | 6/2022 | Yamada et al. |
| 11,393,145 | B2 | 7/2022 | Kunieda et al. |
| 11,576,628 | B2 | 2/2023 | Kaplan et al. |
| 11,830,195 | B2 | 11/2023 | Takahashi et al. |
| 2019/0012790 | A1 * | 1/2019 | Aoba ................... G06V 10/764 |
| 2019/0286153 | A1 | 9/2019 | Rankawat et al. |
| 2020/0218961 | A1 * | 7/2020 | Kanazawa ............. G06N 3/045 |
| 2020/0279422 | A1 | 9/2020 | Yamada et al. |
| 2020/0279423 | A1 | 9/2020 | Yamada et al. |
| 2020/0279426 | A1 | 9/2020 | Yamada et al. |
| 2020/0388062 | A1 | 12/2020 | Kunieda et al. |
| 2021/0052233 | A1 | 2/2021 | Kaplan et al. |
| 2021/0101287 | A1 | 4/2021 | Guo |
| 2021/0272288 | A1 | 9/2021 | Takahashi et al. |
| 2021/0383534 | A1 * | 12/2021 | Tadross ................ G06V 10/454 |
| 2022/0044412 | A1 * | 2/2022 | Yang ..................... G06F 18/214 |
| 2022/0165058 | A1 | 5/2022 | Toda et al. |
| 2022/0172470 | A1 | 6/2022 | Ogasawara et al. |
| 2022/0172471 | A1 | 6/2022 | Yamada et al. |
| 2022/0172472 | A1 | 6/2022 | Yamada et al. |
| 2022/0245931 | A1 * | 8/2022 | Choi ....................... G06V 10/82 |
| 2022/0262054 | A1 | 8/2022 | Takeichi et al. |
| 2022/0262055 | A1 | 8/2022 | Takeichi et al. |
| 2022/0262056 | A1 | 8/2022 | Takeichi et al. |
| 2022/0262057 | A1 | 8/2022 | Takeichi et al. |
| 2022/0263952 | A1 | 8/2022 | Takeichi et al. |
| 2022/0263953 | A1 | 8/2022 | Takeichi et al. |
| 2022/0263954 | A1 | 8/2022 | Takeichi et al. |

FOREIGN PATENT DOCUMENTS

| | | |
|---|---|---|
| JP | 2020-119496 A | 8/2020 |
| JP | 2020-199496 A | 8/2020 |
| JP | 2020-173556 A | 10/2020 |
| JP | 2021-509953 A | 4/2021 |
| WO | 2020/031243 A1 | 2/2020 |

OTHER PUBLICATIONS

Yaoyue Zheng, et al., "Deep Level Set with Conference Map and Boundary Loss for Medical Image Segmentation," 2020 IEEE International Conference on Multimedia and Expo (ICME) IEEE, 2020, https://ieeexplire.ieee/org/document/9102902, pp. 1-6.

Youngeun Kim, et al., "CNN-Based Semantic Segmentation Using Level Set Loss," 2019 IEEE Winter Conference on Applications of Computer Vision (WACV) IEEE, 2019, https://ieeexplore.ieee/org/document/8658668, pp. 1752-1760.

Mar. 28, 2025 Japanese Official Avtion in Japanese Patent Appln. No. 2020-107823.

Mariko Kobayashi, et al., "Proposal of a loss function of an object surface and its application to interlobar fissure extraction from a chest CT volume," IEICE Technical Report, Japan, Institute of Electronics, Information, and Communication Engineers, vol. 111, No. 389, 2012, pp. 147-152 (English-language Abstract only).

* cited by examiner

FIG. 7A
| 0 | -1/2 | 0 |
|---|---|---|
| -1/2 | 0 | 1/2 |
| 0 | 1/2 | 0 |
FIG. 7B
| 0 | 0 | 0 | 1 | 1 |
|---|---|---|---|---|
| 0 | 0 | 0 | 1 | 1 |
| 0 | 0 | 0 | 1 | 1 |
| 0 | 0 | 1 | 1 | 1 |
| 0 | 0 | 1 | 1 | 1 |
FIG. 7C
| 0 | 0 | 1/2 | 1/2 | 0 |
|---|---|---|---|---|
| 0 | 0 | 1/2 | 1/2 | 0 |
| 0 | 0 | 1 | 1/2 | 0 |
| 0 | 1/2 | 1 | 0 | 0 |
| 0 | 1/2 | 1/2 | 0 | 0 |
FIG. 7D
| 1 | 1 | 1/2 | 1/2 | 1 |
|---|---|---|---|---|
| 1 | 1 | 1/2 | 1/2 | 1 |
| 1 | 1 | 0 | 1/2 | 1 |
| 1 | 1/2 | 0 | 1 | 1 |
| 1 | 1/2 | 1/2 | 1 | 1 |
FIG. 7E
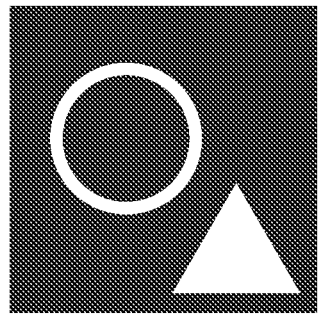
FIG. 7F
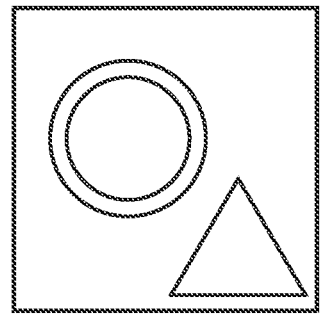

FIG. 12A

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

FIG. 12B

| 1,0,0 | 1,0,0 | 1,0,0 | 1,0,0 |
|---|---|---|---|
| 1,0,0 — 1201 | 1,0,0 | 1,0,0 | 1,0,0 |
| 0,1,0 | 0,1,0 | 0,1,0 | 0,1,0 |
| 0,1,0 | 0,1,0 | 0,1,0 | 0,1,0 |

FIG. 12C

| 1,0,0 | 1,0,0 | 1,0,0 | 1,0,0 |
|---|---|---|---|
| $\frac{2}{3}, \frac{1}{3}, 0$ — 1202 | $\frac{2}{3}, \frac{1}{3}, 0$ | $\frac{2}{3}, \frac{1}{3}, 0$ | $\frac{2}{3}, \frac{1}{3}, 0$ |
| $\frac{1}{3}, \frac{2}{3}, 0$ | $\frac{1}{3}, \frac{2}{3}, 0$ | $\frac{1}{3}, \frac{2}{3}, 0$ | $\frac{1}{3}, \frac{2}{3}, 0$ |
| 0,1,0 | 0,1,0 | 0,1,0 | 0,1,0 |

INFORMATION PROCESSING APPARATUS, INFORMATION PROCESSING METHOD, NON-TRANSITORY COMPUTER-READABLE STORAGE MEDIUM STORING PROGRAM, AND SYSTEM

BACKGROUND OF THE INVENTION

Field of the Invention

The present invention relates to an information processing apparatus for executing labeling on a pixel basis, an information processing method, a non-transitory computer-readable storage medium storing a program, and a system.

Description of the Related Art

There exists an image segmentation technique of recognizing an object captured in an image. In image segmentation, an image is divided into several regions, and the regions are classified. A technique as described in a literature (Olaf Ronneberger, Philipp Fischer, and Thomas Brox, "U-Net: Convolutional Networks for Biomedical Image Segmentation", Medical Image Computing and Computer-Assisted Intervention—MICCAI 2015, pp. 234-241) is known. In recent years, a neural network in deep learning is applied to image segmentation. When an image is input to the neural network, a label image in which each pixel has, as a value, a label representing to which object it belongs can be obtained.

Japanese Patent Laid-Open No. 2020-119496 describes a technique of generating learning data to be used in a convolutional neural network (CNN) for object detection. Japanese Patent Laid-Open No. 2020-119496 also describes a technique of learning a CNN configured to obtain a precise label image by enhancing an edge portion between a background and an object.

SUMMARY OF THE INVENTION

The present invention provides an information processing apparatus configured to appropriately execute learning based on image data, an information processing method, a non-transitory computer-readable storage medium storing a program, and a system.

The present invention in one aspect provides an information processing apparatus comprising: an acquisition unit configured to acquire a set of image data and label data serving as correct answer data and representing, as a label value, a region to which a pixel of the image data belongs; an estimation unit configured to estimate, from the image data, a region to which each pixel of the image data belongs using a learning model; a calculation unit configured to calculate an error between the label data and an estimation result by the estimation unit; an updating unit configured to update the learning model based on the error calculated by the calculation unit, and a control unit, wherein the calculation unit calculates a first error for a boundary region of an image represented by the image data, calculates a second error for a non-boundary region different from the boundary region, and calculates the error between the label data and the estimation result based on the first error and the second error, and the control unit is configured to perform control such that an influence of the first error on the calculation by the calculation unit is smaller than an influence of the second error on the calculation by the calculation unit.

According to the present invention, it is possible to appropriately execute learning based on image data.

Further features of the present invention will become apparent from the following description of exemplary embodiments with reference to the attached drawings.

BRIEF DESCRIPTION OF THE DRAWINGS

FIGS. 7A to 7F are views for explaining edge extraction processing;

FIGS. 12A to 12C are views for explaining processing of a label.

DESCRIPTION OF THE EMBODIMENTS

Figure 1:
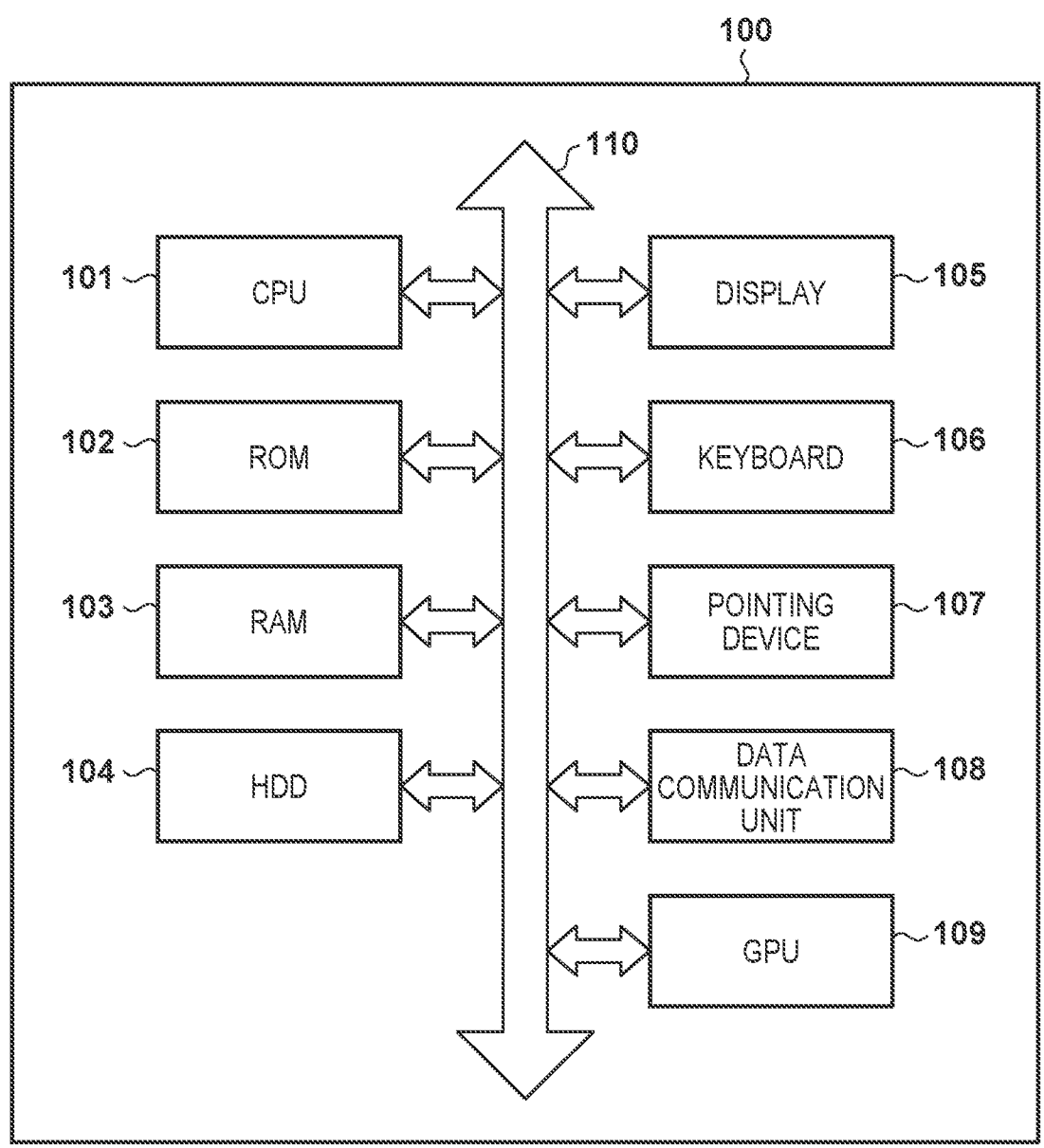
FIG. 1 is a block diagram showing the hardware configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In an image obtained by reading a print product by a scanner or a camera, the boundary between a print region and a non-print region or the boundary between printed objects is not strictly determined because of bleeding caused by ink permeating along a sheet surface or a blur that occurs at the time of scanning. For this reason, learning may not be appropriately executed.

According to the present invention, it is possible to appropriately execute learning based on image data.

First Embodiment

In this embodiment, a configuration for operating an application configured to learn a neural network (NN) in a learning apparatus, that is, a configuration for learning a neural network configured to determine, for each pixel of an input image, the type of a region to which the pixel belongs will be described. Note that in the following description, "neural network" indicates a mathematical model adaptable to a problem of segmentation, for example, a full connection neural network, a convolutional neural network (CNN), or Transformer, unless otherwise specified.

The neural network as the background of this embodiment will be described first. The neural network is a mathematical model imitating a part of a neural circuit of a brain. Particularly, in an image processing technique, a convolutional neural network is often used. The convolutional neural network is a learning type image processing technique for repeating convolution of a filter generated by learning in an image and then execution of a nonlinear operation. The filter is also called a local receptive field (LPF). An image obtained by convolving the filter in an image and performing a nonlinear operation is called a feature map. In addition, learning is performed using training images formed from a set of an input training image and a correct answer training image, and a filter value capable of accurately converting an input training image to a corresponding correct answer training image is generated. If the image has RGB color channels, or the feature map is formed from a plurality of images, the filter used for convolution also has a plurality of channels. That is, the convolutional filter is expressed by a four-dimensional array including not only the vertical and horizontal sizes and the number of filters but also the number of channels. Processing of convolving the filter in an image (or a feature map) and then performing a nonlinear operation is expressed by a unit called a layer. For example, an expression such as a feature map of the mth layer or a filter of the nth layer is used. For example, a CNN that repeats filter convolution and a nonlinear operation three times has a three-layer network structure. This processing can be formulated as follows.

$$X_n^{(l)} = f\left(\sum_{k=1}^{K} W_n^{(l)} * X_{n-1}^{(k)} + b_n^l\right) \quad (1)$$

In equation (1), Wn is the filter of the nth layer, bn is the bias of the nth layer, f is the nonlinear operator, Xn is the feature map of the nth layer, and * is a convolution operator. Note that (l) on the upper right side represents that this is the lth filter or feature map. The filter and the bias are generated by learning to be described later and called network parameters or model parameters together. As the nonlinear operation, for example, a sigmoid function or an ReLU (Rectified Linear Unit) is used.

Learning of a CNN will be described next. Learning of a CNN is performed by minimizing an objective function generally represented by equation (2) below for training images formed from a set of an input training image and a corresponding correct answer training image.

$$L(\theta) = \frac{1}{n}\sum_{i=1}^{n} \|F(X_i; \theta) - Y_i\|_2^2 \quad (2)$$

where L is a loss function configured to measure an error between an output image output from the CNN and a correct answer training image. $Y_i$ is the ith correct answer training image, and $X_i$ is the ith input training image. F is a function that expresses operations (equation (1)) performed in the layers of the CNN together. θ is a model parameter (a filter and a bias). $\|Z\|_2$ is the L2 norm and, more simply stating, the square root of the square sum of an element of a vector Z. Also, n is the total number of training images used in learning.

To minimize (=optimize) equation (2), there is known a back propagation method of updating the model parameter θ based on the error calculated by equation (2). For example, in stochastic gradient descent (SGD), learning is performed by repetitively updating the model parameter in accordance with $$\theta_{t+1} = \theta_t - \alpha \nabla L(\theta_t) \quad (3)$$

where $\theta_t$ is the model parameter of the tth time, and α is the learning rate for controlling the updating amount of the model parameter. As the optimization method, various methods such as the momentum method, the AdaGrad method, the AdaDelta method, and the Adam method are also known. Note that since the total number of training images is large in general, some of the training images are selected at random and used in learning. This can reduce the calculation load in learning using many training images. When the model parameter learned using many training images is used, an output image can be estimated even for an unknown input image that is not included in the input training images. Note that although a general CNN learning method has been described here, learning can also be performed even in another neural network by similarly optimizing the model parameter to minimize the objective function.

FIG. 1 is a block diagram showing an example of the hardware configuration of a learning apparatus according to this embodiment. Note that as a learning apparatus 100, for example, an information processing apparatus such as a personal computer (to be referred to as a PC hereinafter) or a server is used. In this embodiment, a description will be made assuming that the learning apparatus 100 is a PC. The learning apparatus 100 includes a CPU 101, a ROM 102, a RAM 103, an HDD 104, a display 105, a keyboard 106, a pointing device 107, a data communication unit 108, a GPU 109, and a data bus 110.

The CPU (central processing unit/processor) 101 generally controls the learning apparatus 100, and, for example, reads out a program stored in the ROM 102 to the RAM 103 and executes it, thereby implementing an operation according to this embodiment. In FIG. 1, only one CPU exists. However, a plurality of CPUs may be included. The ROM 102 is a general-purpose ROM and, for example, stores programs to be executed by the CPU 101. A RAM 103 is a general-purpose RAM and, for example, is used as a working memory configured to temporarily store various kinds of information when a program is executed by the CPU 101. The HDD (hard disk) 104 is a storage medium (storage unit) configured to store image files, parameter data to be used in learning, and the like.

The display 105 is a display unit configured to display a user interface (UI) according to this embodiment and a result of learning to a user. The keyboard 106 and the pointing device 107 accept instruction operations from the user. The keyboard 106 is used, for example, by the user to input a parameter associated with learning on a UI displayed on the display 105. The pointing device 107 is used, for example, by the user to click a button on a UI displayed on the display 105. The data communication unit 108 performs communication with an external device via a wired or wireless network. The data communication unit 108, for example, transmits a learning result to a server capable of communicating with the learning apparatus 100.

The GPU 109 can perform an efficient operation by parallelly processing a larger quantity of data. For this reason, if learning is performed a plurality of times using a learning model, like deep learning, it is effective to perform processing by the GPU 109. In this embodiment, when executing a learning program including a learning model, learning is performed by the CPU 101 and the GPU 109 cooperatively performing an operation. Note that in learning processing, an operation may be performed only by the CPU 101 or the GPU 109.

The data bus 110 communicably connects the blocks shown in FIG. 1 to each other. Note that the configuration shown in FIG. 1 is merely an example, and the configuration is not limited to this. For example, the learning apparatus 100 may not include the display 105, and may display a UI on an external display.

A learning application according to this embodiment is stored in the HDD 104. As will be described later, when the user selects, using the pointing device 107, the icon of the application displayed on the display 105 and clicks or double-clicks on it, the learning application is activated. The learning apparatus 100 is not limited to the configuration shown in FIG. 1, and can appropriately include configurations according to functions executable by the learning apparatus 100. For example, if the apparatus indicated by the learning apparatus 100 is a printer, the configuration of a print engine is included.

Figure 2:
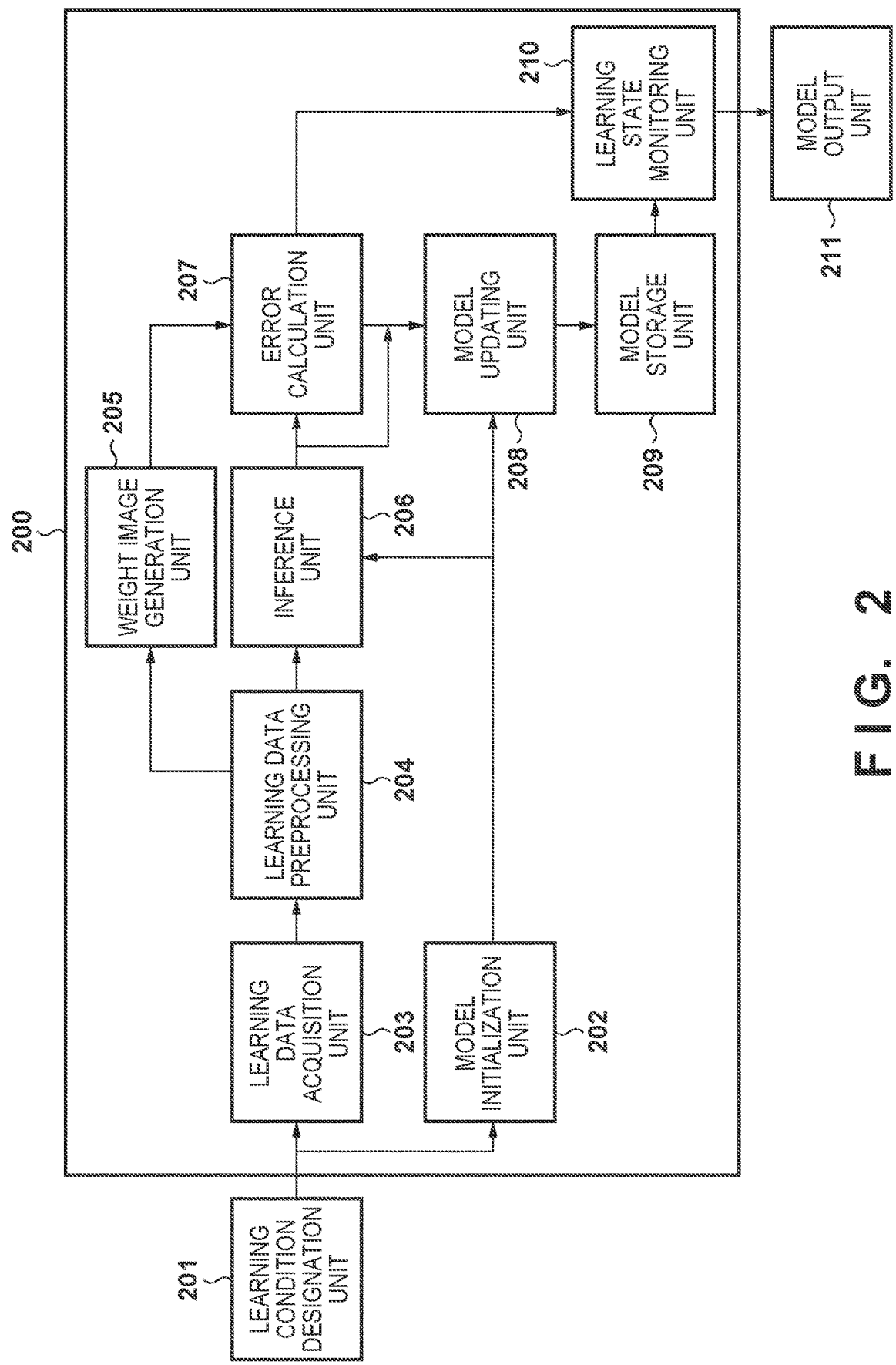
FIG. 2 is a block diagram showing the software configuration of a learning application.

FIG. 2 is a block diagram showing an example of the configuration of software blocks of the learning application. The learning application includes a learning processing unit 200, a learning condition designation unit 201, and a model output unit 211. The learning processing unit 200 includes a model initialization unit 202, a learning data acquisition unit 203, a learning data preprocessing unit 204, a weight image generation unit 205, an inference unit 206, an error calculation unit 207, a model updating unit 208, a model storage unit 209, and a learning state monitoring unit 210.

Program modules corresponding to the constituent elements shown in FIG. 2 are included in the above-described learning application. The CPU 101 functions as the constituent elements shown in FIG. 2 by generally executing the program modules. The constituent elements shown in FIG. 2 will be described below assuming that the constituent elements execute various kinds of processing.

In accordance with a UI operation by the pointing device 107, the learning condition designation unit 201 designates learning conditions in the learning processing unit 200. In this embodiment, a learning image group and a supervisory data group to be used in learning, and a model structure to be used in learning can be designated as the learning conditions. The learning image group and the supervisory data group may be designated based on, for example, a device and the structure of a file system including images, such as a directory, or may be designated by the attribute information of an image file such as a file name. For the model structure, for example, a model file in which the structure of a model is described may be designated, or the name of a model structure incorporated in the application in advance may be designated.

Note that in this embodiment, "supervisory data" corresponds to correct answer data representing a correct answer value corresponding to a learning image and is also called "correct answer image", "label image", or "label data". "Label" is a value representing a target to learn, unless otherwise specified. For example, in learning, assume that regions are classified into four regions, that is, a character region representing pixels that form a character, an image region representing pixels that form a natural image, a drawing region representing pixels that form a drawing, and a background region representing pixels that form a background color, a non-print region, or the like. In this case, a value (for example, 0, 1, 2, or 3) uniquely representing each region is defined as a label.

Figures 3A, 3B, 3C:
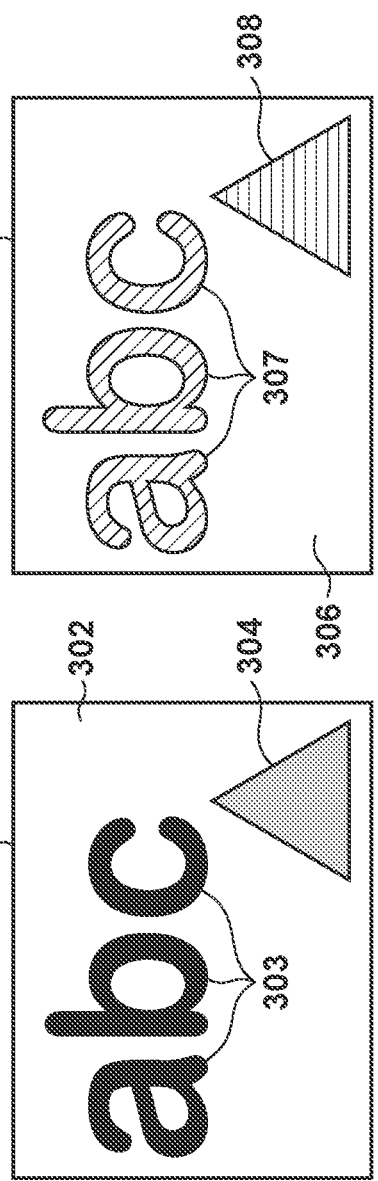
FIGS. 3A to 3C are views showing learning data.

FIGS. 3A to 3C are views showing examples of label images. Note that in this embodiment, for the sake of simplicity, a description will be made using three regions including a background region, a character region, and a graphic region that combines an image region and a drawing region. FIG. 3A shows an example of a learning image. A learning image 301 is an RGB image formed by a character region 303 in which characters are written, a graphic region 304 in which a graphic is drawn, and a background region 302 in which nothing is drawn. In this embodiment, "RGB image" is an image in which each of Red, Green, and Blue color components is expressed by 8 bits (=256 tones), unless otherwise specified.

FIG. 3B is a view showing an example of a label image 305 corresponding to the learning image 301. The label image 305 is a grayscale image in which "0" is set for each pixel of a background region 306, "1" is set for each pixel of a character region 307, and "2" is set for each pixel of a graphic region 308. In this case, "0", "1", and "2" are labels representing the background region, the character region, and the graphic region, respectively.

FIG. 3C shows another example of the label image. A label image 309 is a 3-channel image formed by a channel 310 representing the background region, a channel 311 representing the character region, and a channel 312 representing the graphic region. In each channel, "1" is set in a target region 313 represented by the channel, and "0" is set in a non-target region 314. In this case, a value obtained by sequentially arranging the values of the channel 310, the channel 311, and the channel 312 is a label that corresponds to the pixel value of the label image. That is, "(1, 0, 0)", "(0, 1, 0)", and "(0, 0, 1)" are labels representing the background region, the character region, and the graphic region, respectively. Vectorizing a variable representing a classification is also called One-hot Encoding. Note that a plurality of regions may overlap in one pixel. For example, if the character region and the graphic region overlap, the label may be set to "(0, 1, 1)", thereby expressing that the two regions overlap. Also, in this embodiment, a segmentation model that classifies regions into three types of regions including a background region, a character region, and a graphic region is learned. However, the region segmentation method is not limited to this. Regions may be classified into two regions including a print region and a non-print region, or a specific region such as a table or a natural image may be classified. Furthermore, a print defect region generated by a trouble such as rubbing or non-discharge in a printing step may be classified. Also, in this embodiment, "model" corresponds to a mathematical model using a neural network. However, another machine learning model such as a support vector machine may be used.

The model initialization unit 202 acquires, from the HDD 104, the model structure designated by the learning condition designation unit 201. The model initialization unit 202 initializes a model parameter corresponding to the acquired model structure, and outputs the model structure and the model parameter to the inference unit 206.

The learning data acquisition unit 203 acquires, from the HDD 104, the learning image group designated by the learning condition designation unit 201 and the label image group corresponding to the learning images. The learning data acquisition unit 203 outputs the acquired learning images and label images to the learning data preprocessing unit 204. Identification information is added to each of the learning images and the label images, and the learning data preprocessing unit 204 can associate the learning images and the label images.

As a learning image stored in the HDD 104, a still image obtained by scanning a print product or acquired from an image capturing device such as a digital camera is used. Note that the image capturing device may be provided in the learning apparatus 100 or may be provided in an external device. Note that if the image capturing device is an external device, the learning image is acquired via the data communication unit 108. As the label image stored in the HDD 104, an image created by a label image creation device (or application) in correspondence with a learning image is used. The label image creation device may, for example, display a learning image on the display 105 and cause the user to designate a label for each pixel using the pointing device 107, or may create a label image from a learning image using a learned model. Use of a learned model is effective particularly when learning a model that is lighter or faster than the learned model and has the same function as that. Note that the label image creation device may be provided in the learning apparatus 100 or may be provided in an external device.

The learning data preprocessing unit 204 processes the learning images and the label images input from the learning data acquisition unit 203 by a method to be described later to use these in the weight image generation unit 205 and the inference unit 206. The learning data preprocessing unit 204 outputs the processed label images (correct answer training images) to the weight image generation unit 205, and the processed learning images (input training images) to the inference unit 206. Identification information is added to each of the input training images and the correct answer training images, and the error calculation unit 207 can associate these.

Based on the correct answer training images input from the learning data preprocessing unit 204, the weight image generation unit 205 generates weight images by a method to be described later to use these in the error calculation unit 207. The weight image generation unit 205 outputs the correct answer training images and the generated weight images to the error calculation unit 207. Identification information is added to each weight image, like the input training images and the correct answer training images, and the error calculation unit 207 can associate the input training images, the correct answer training images, and the weight images. In this embodiment, the weight image is an image used to control the degree of influence of each pixel in learning. Each weight image is, for example, an image which has the same size as a corresponding label image and in which weight data of 0 to 1 representing the degree of influence on learning is set as the value of each pixel.

For each input training image input from the learning data preprocessing unit 204, the inference unit 206 performs inference processing in accordance with the model structure and the model parameter input from the model initialization unit 202 and the model updating unit 208, thereby generating an estimated label image (output image) as an estimation result. The inference unit 206 outputs the estimated label image to the error calculation unit 207, and the model parameter to the model updating unit 208. The estimated label image is an image that holds, as a pixel value, a value probabilistically expressing the label of each pixel of the input training image. For example, in a model that discriminates three regions including a background region, a character region, and a graphic region, assume that it is estimated as the result of estimation that the possibility that a certain pixel of an input training image belongs to the background region is 10%, the possibility of the character region is 70%, and the possibility of the graphic region is 20%. In this case, the estimated label image is formed by, for example, three channels including a channel representing the background region, a channel representing the character region, and a channel representing the graphic region, and the pixel value is given by (0.1, 0.7, 0.2).

For the correct answer training image and the weight image input from the weight image generation unit 205 and the estimated label image input from the inference unit 206, the error calculation unit 207 calculates the error between the correct answer training image and the estimated label image by a method to be described later. The error calculation unit 207 outputs the calculated error to the model updating unit 208 and the learning state monitoring unit 210.

For the model parameter input from the inference unit 206 and the error input from the error calculation unit 207, the model updating unit 208 updates the model parameter to minimize the error. The model updating unit 208 outputs the updated model parameter to the model storage unit 209 and the inference unit 206. Note that identification information is added to the model parameter, and the model storage unit 209 can associate the model parameter with information representing how many times model updating was performed to obtain the model parameter.

The model storage unit 209 stores, in the HDD 104 or the RAM 103, the model structure and the model parameter input from the model updating unit 208. Also, the model storage unit 209 acquires the model structure and the model parameter stored in the HDD 104 or the RAM 103 and outputs these to the learning state monitoring unit 210. The learning state monitoring unit 210 holds the history of errors input from the error calculation unit 207, and judges, based on the history of errors, whether to continue learning or end learning. To end learning, the learning state monitoring unit 210 acquires the model parameter from the model storage unit 209 and outputs it to the model output unit 211. The model output unit 211 stores, in the HDD 104, the model parameter input from the learning state monitoring unit 210.

When the learning application is installed in the learning apparatus 100, an activation icon is displayed on the top screen (desktop) of an OS (Operating System) operating on the learning apparatus 100. Using the pointing device 107, the user double-clicks the activation icon displayed on the display 105. Then, the program of the application stored in the HDD 104 is loaded into the RAM 103 and executed by the CPU 101, and the learning application is activated.

Figure 4:
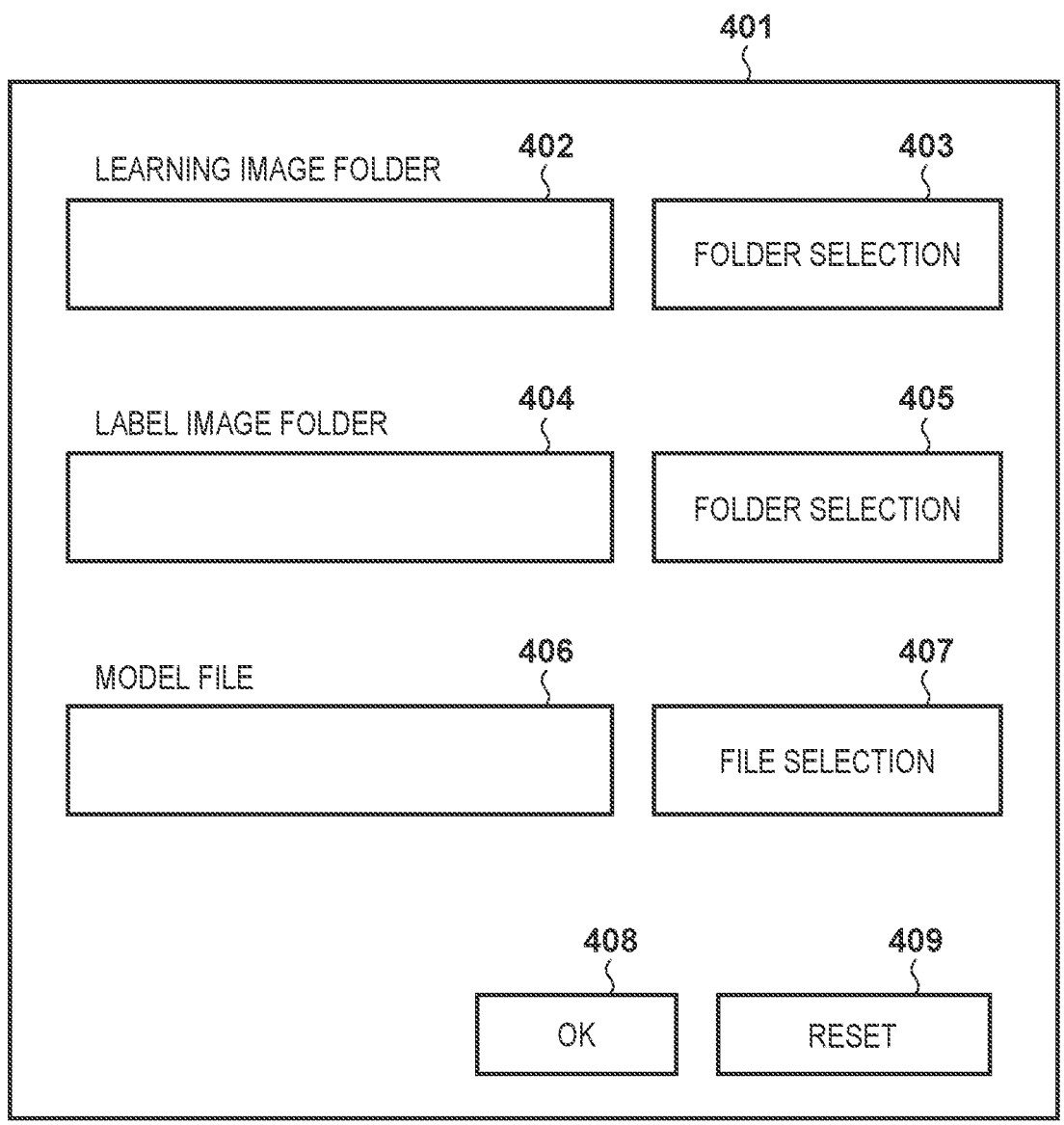
FIG. 4 is a view showing a user interface screen.

FIG. 4 is a view showing an example of an application activation screen 401 provided by the learning application. The application activation screen 401 is displayed on the display 105. The user sets learning conditions to be described later via the application activation screen 401, and the learning condition designation unit 201 acquires the set contents from the user via the UI screen.

A path box 402 on the application activation screen 401 displays the storage location (path), in the HDD 104, of a plurality of learning images (for example, a plurality of image files) as the target of learning. When a folder selection button 403 is instructed by a click operation of the user using the pointing device 107, a folder selection screen that is standard equipment of the OS is displayed. Folders set in the HDD 104 are displayed in a tree structure on the folder selection screen, and the user can select a folder including learning images as the target of learning using the pointing device 107. The path of the folder storing the learning image group selected by the user is displayed in the path box 402.

A path box 404 displays the storage location, in the HDD 104, of a plurality of label images as the target of learning. By a folder selection button 405, the user can select a folder including label images as the target of learning by the same method as the folder selection button 403. The path of the folder storing the label image group selected by the user is displayed in the path box 404.

A path box 406 displays the storage location, in the HDD 104, of a model (for example, a model file in which the structure of the model is described) as the target of learning.

When a file selection button 407 is instructed by a click operation of the user using the pointing device 107, a file selection screen that is standard equipment of the OS is displayed. Files set in the HDD 104 are displayed in a tree structure on the file selection screen, and the user can select a model file as the target of learning using the pointing device 107. The path of the model file selected by the user is displayed in the path box 406.

When the user presses an OK button 408, the learning condition designation unit 201 outputs the contents set on the application activation screen 401 to the learning processing unit 200 of the learning application. At this time, the paths input to the path box 402 and the path box 404 are transmitted to the learning data acquisition unit 203. The path input to the path box 406 is transmitted to the model initialization unit 202.

Note that in this embodiment, an example of an application that displays a UI has been described. However, the present invention is not limited to this. For example, a program code describing processing contents may be used. In this case, learning conditions are directly described in a setting file or program code, and the program stored in the HDD 104 is read out to the RAM 103 and executed, thereby performing learning.

Figure 5:
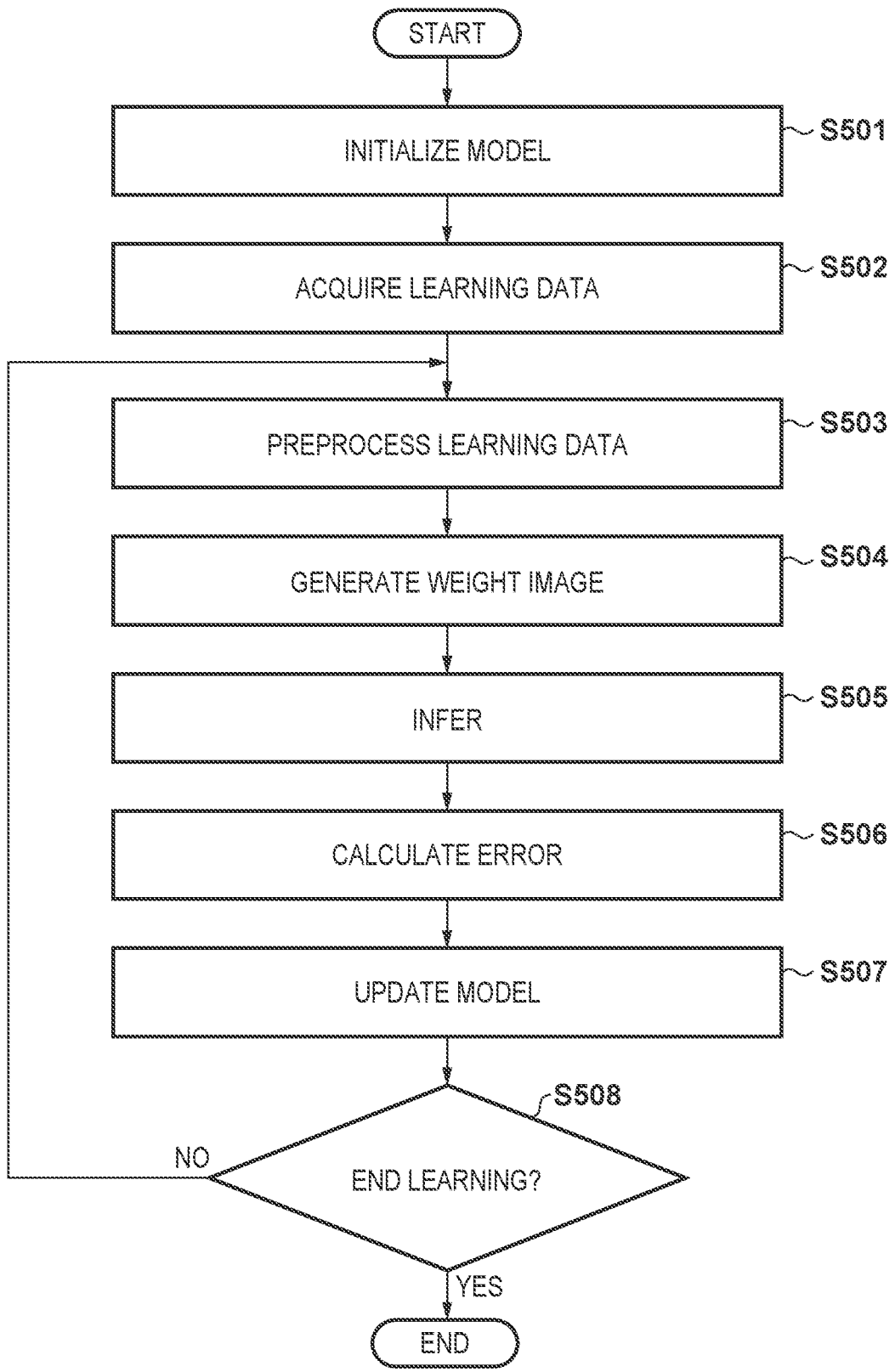
FIG. 5 is a flowchart showing learning processing.

FIG. 5 is a flowchart showing processing of the learning processing unit 200 of the learning application. The flowchart shown in FIG. 5 is implemented by, for example, the CPU 101 reading out the program stored in the HDD 104 to the RAM 103 and executing it. The description of FIG. 5 will be made assuming that the constituent elements shown in FIG. 2, which function when the CPU 101 executes the learning application, execute the processing. Learning processing according to this embodiment will be described with reference to FIG. 5.

In step S501, the model initialization unit 202 initializes the model. At the start of step S501, various kinds of settings via the UI screen of the application activation screen 401 are completed. More specifically, in step S501, the model initialization unit 202 specifies a model file in the HDD 104, which is designated by the learning condition designation unit 201. The model initialization unit 202 then reads out a model structure described in the model file from the HDD 104 to the RAM 103. The model initialization unit 202 sets a model parameter corresponding to the model structure to a random value. As a model for performing image segmentation, various models such as U-Net and DeepLab are known. In this embodiment, for example, a model similar to U-Net is used. The number of output channels is changed in accordance with the number of targets to be classified. For example, when classifying regions into three regions including a background region, a character region, and a graphic region, the model structure is changed such that the number of output channels becomes 3. Note that the model to be used is not limited to this, and any other model may be used.

In step S502, the learning data acquisition unit 203 acquires a learning image group and a label image group. More specifically, the learning data acquisition unit 203 specifies a plurality of image files stored in the folder in the HDD 104, which is designated by the learning condition designation unit 201. The learning data acquisition unit 203 reads out the plurality of specified image files from the HDD 104 to the RAM 103. Note that when acquiring learning data, the learning data acquisition unit 203 adds identification information that associates a learning image and a label image. For example, an image file name in the HDD 104 is added as identification information to a learning image and a label image. The learning data acquisition unit 203 discards, from the RAM 103, a learning image not including both a learning image and a label image, which have the same identification information and form a set. As the format of image data, digital data loadable to a computer can be used. For example, RAW, Bitmap, or JPEG may be used. In addition, either a color image or a monochrome image can be used. In this embodiment, a learning image is an RGB image of Bitmap. A label image is a 3-channel Bitmap image that has undergone One-hot Encoding. Note that if the label image is a monochrome image in which a label value is described, the learning data acquisition unit 203 may perform One-hot Encoding to convert the image into a 3-channel label image.

In step S503, the learning data preprocessing unit 204 converts the learning image and the label image received from the learning data acquisition unit 203 into a format suitable for learning. More specifically, the learning data preprocessing unit 204 first normalizes the learning image. In this embodiment, for example, for each channel of the RGB image, the value of each pixel is divided by 255 to perform normalization such that the pixel value falls within the range of 0 to 1. Normalization is known as a method of stabilizing learning, and a method of normalizing a pixel value to −1 to +1 or a method of calculating a different from the average value of all learning images can also be used. Next, the learning data preprocessing unit 204 extracts, from each normalized learning image, an image of a fixed size (for example, 256 px (pixels)×256 px) at a random position. Next, the learning data preprocessing unit 204 extracts, from a label image corresponding to the learning image, an image of the same position and size as the learning image. The thus processed learning image group and label image group are expressed by a four-dimensional array of [number of images×width×height×number of channels] and will also be referred to as input training images and correct answer training images hereinafter. In this embodiment, an image is extracted at a random position. However, the present invention is not limited to this. For example, various processing methods of changing the size at random, deforming an image, changing a color, adding a noise component, or imparting diversity to learning may be used.

In step S504, the weight image generation unit 205 generates a weight image based on each correct answer training image received from the learning data preprocessing unit 204. In this embodiment, the weight image is generated to suppress the influence of the boundary portion of a region in the correct answer training image on learning.

Figure 6A:
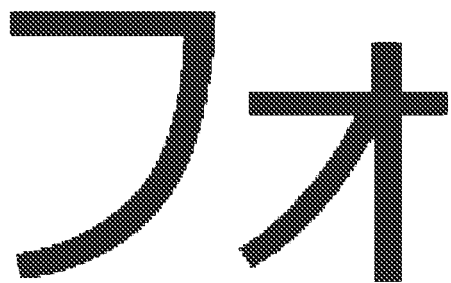
FIGS. 6A to 6E are views for explaining a boundary region.
Figure 6B:
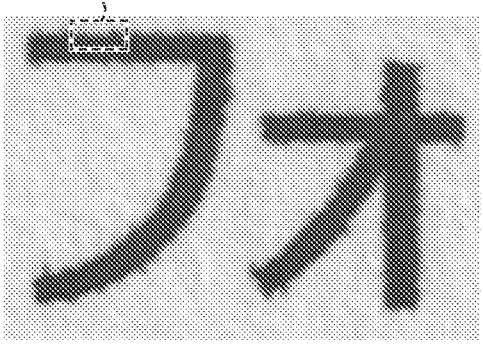
Figure 6C:
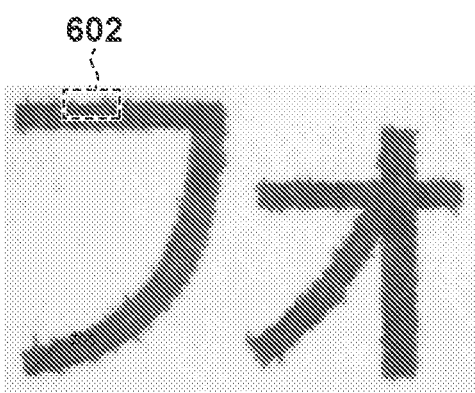

The characteristic of the boundary portion of a correct answer label will be described here. FIGS. 6A to 6E are views for explaining the boundary portion between a print region and a non-print region. FIG. 6A is a view showing an example of original data that is a print source. FIG. 6B is a view showing an example of a scan image obtained by reading, using a scanner, a sheet on which the data shown in FIG. 6A is printed. FIG. 6C is a view showing an example of an enlarged image obtained by optically enlarging, using a microscope, the same image on the sheet read in FIG. 6B and reading it. In FIG. 6B, printing is performed at a resolution of 600 dpi using an inkjet printer, and reading using a scanner is performed similarly at a resolution of 600 dpi.

Figure 6D:
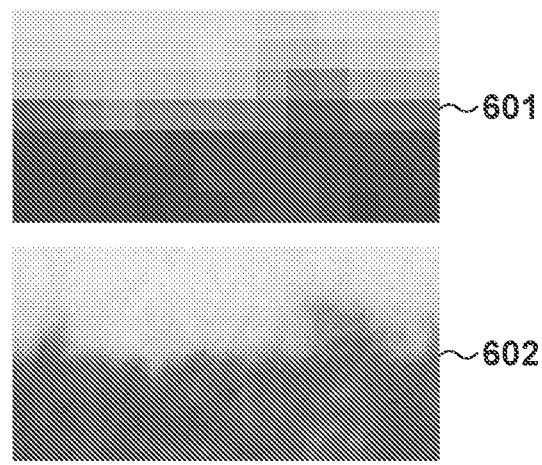

FIG. 6D is a view showing a region 601 and a region 602 in an enlarged state. Note that the region 601 has a size of 14 px (width)×7 px (height) and therefore corresponds to a region of 0.59 mm (width)×0.3 mm (height) on a sheet surface. Even in a straight line on the original, like the region 602, ink on the sheet surface after printing has unevenness in a microscopic view. This is because in an inkjet printer, an ink droplet discharged from a nozzle may land at a position deviated a little from an originally been intended landing position. The unevenness also occurs due to an ink droplet permeating along the fibers of the sheet surface. Also, in the region 601, a blur occurs due to reading by the scanner. This occurs due to a factor such as insufficient resolutions of a lens and an image capturing element or defocus caused by slight floating of the sheet surface. A correct answer training image holds the classification label of a correct answer for each pixel of a learning image as indicated by the region 601.

Figure 6E:
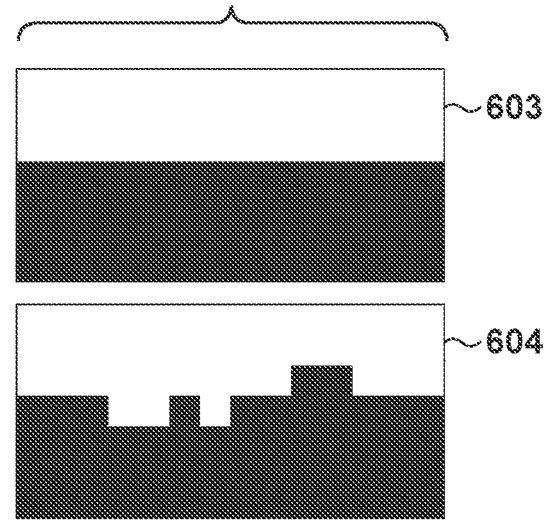

FIG. 6E shows an example of a correct answer label corresponding to the region 601. In FIG. 6E, the background region is shown in white, and the character region is shown in black. In general, the correct answer label is manually designated by a person, or a semiautomatic method of causing a person to correct a label automatically classified by a certain algorithm is used. A correct answer label 603 is an example of an ideal correct answer label obtained from original data. However, in a scan image, the sheet surface locally deforms in the printing and scanning steps. It is therefore very difficult to associate the original data with the pixels of the scan image. Furthermore, as described above, since a read print region includes irregular unevenness or blur in the printing and scanning steps, a position deviation occurs between the correct answer label and the scan image. A correct answer label 604 is a correct answer label obtained by performing threshold processing and binarization for the region 601. Since this correct answer label is generated based on the scan image, no position deviation occurs. On the other hand, even if the shape is originally the same, the boundary irregularly varies due to the color and density in the print region or the degree of blur at the time of scan. In addition, unevenness in the print region in printing is also reflected on the correct answer label. Manual designation or correction by a person is also difficult practically when there are an enormous number of (several hundred or hundreds of thousands) images. It is also difficult to designate a label based on a predetermined criterion for an image having an unclear boundary, like the region 601.

As described above, there does not exist a correct answer label uniquely determined for the scan image of a print product, and "correct answer" for the boundary portion of the correct answer label varies to some extent. If learning is performed without considering this, an irregular error that cannot be optimized is generated in the boundary region that should originally be the correct answer, and learning cannot progress. Note that although the boundary between a print region and a non-print region has been described with reference to FIGS. 6A to 6E, a similar phenomenon may occur even in the boundary between different ink colors. Hence, a uniquely determined correct answer label does not exist for the boundary between adjacent print objects, for example, a background color and a character printed on it. In this embodiment, considering the variation of the correct answer of the boundary portion as described above, the influence of the error between the estimated label and the learning label in the boundary portion on the learning can be suppressed by a weight image.

A method of generating, by the weight image generation unit 205, a weight image used to suppress the influence of the boundary portion of a correct answer training image by applying a first-order differential filter to the correct answer training image will be described below. FIGS. 7A to 7F are views for explaining the weight image generation method. FIG. 7A shows the first-order differential filter used in this embodiment. FIG. 7B shows an example of a portion in a correct answer training image. Note that one channel of the correct answer training image is shown here for the sake of simplicity, and 1 represents a region as a classification target region, and 0 represents a region other than the classification target.

FIG. 7C shows a result of performing a convolution operation of the filter shown in FIG. 7A into the image shown in FIG. 7B. Note that if the convolution operation is directly performed for the image shown in FIG. 7B, the operation result is difficult to handle because the size is reduced by 1 px on each side to 3 px×3 px. For this reason, in this embodiment, padding processing is performed to duplicate the same pixel value at an image end by 1 px on each side, and in fact, the convolution operation is performed after the image is extended to 7 px×7 px.

FIG. 7D shows a final weight image obtained by subtracting the absolute value of each pixel value shown in FIG. 7C from 1. Note that although one channel in one image has been described here as an example, similar processing may be performed as many times as the number of images and the number of channels. This processing is formulated by $$M = 1 - |G*Y| \quad (4)$$

In equation (4), G is the first-order differential filter, Y is the correct answer training image, and M is the weight image. FIG. 7E is a view schematically showing an example of the correct answer training image. FIG. 7F is a view schematically showing an example of the weight image generated from the image shown in FIG. 7E. In FIGS. 7E and 7F, black indicates a pixel of 0, and white indicates a pixel of 1. In this way, the weight image generation unit 205 generates a weight image in which the weight of a pixel corresponding to the boundary portion of a region is small with respect to the correct answer training image, and the weight of a pixel corresponding to a portion other than the boundary is large. Note that in this embodiment, boundary extraction using a first-order differential filter used. However, the weight image generation method is not limited to this. For example, a two-dimensional filter such as a Laplacian filter may be used, or shrinkage and expansion by a morphology operation may be used. More specifically, the boundary extraction may be performed by calculating the difference between an image obtained by shrinking the correct answer training image and an image obtained by expansion. In this method, the weight to a region of a predetermined number of pixels from the boundary can be suppressed and, for example, the boundary region can completely be neglected. In addition, after boundary extraction by filter processing, another processing may be performed. For example, the weight and the periphery may be smoothed using a blur filter such as a Gaussian filter, thereby gradually increasing the weight in accordance with the distance from the boundary. In addition, a lower limit value or an upper limit value may be provided for the weight. For example, when the lower limit value is set to 0.1, it is possible to control not to completely set the weight to 0 while reducing the weight of the boundary region. This makes it possible to perform learning with importance placed on the non-boundary region while avoiding estimation from becoming unstable because the boundary region cannot be learned at all. In this embodiment, the weight of the boundary region of the label is reduced with respect to the weight of the non-boundary region by any method.

In step S505, for the input training image received from the learning data preprocessing unit 204, the inference unit 206 performs inference processing in accordance with the model structure and the model parameter received from the model initialization unit 202 and the model updating unit 208. The inference unit 206 infers an estimated label image.

In step S506, the error calculation unit 207 calculates an error for the correct answer training image and the weight image received from the weight image generation unit 205 and the estimated label image received from the inference unit 206. Error calculation performed in this embodiment is formulated by $$L(\theta) = \frac{1}{n}\sum_{i=1}^{n}\|(F(X_i;\theta) - Y_i)\circ M_i\|_2^2 \qquad (5)$$

where L is the loss function configured to measure the error between the correct answer training image and the output image output from the CNN. $Y_i$ is the ith correct answer training image, $X_i$, is the ith input training image, and $M_i$ is the ith weight image. Also, $\circ$ is the Hadamard product that represents the element-wise product of two matrices. F is a function that expresses operations (equation (1)) performed in the layers of the CNN together, and means inference by the inference unit 206. $\theta$ is a model parameter (a filter and a bias). Also, n is the total number of training images used in learning. As described concerning step S504, the weight of the weight image M becomes smaller near the boundary portion of a region. For this reason, the error calculated by equation (5) is smaller in the boundary portion as compared to equation (2) that is a loss function used in general, and the error in the non-boundary portion is directly calculated. That is, the influence of the boundary portion on the overall error is reduced. This is particularly effective for a segmentation target such as a character or a graphic that is formed by thin line segments and has a large area in the boundary portion as compared to the area of the region. Note that in this embodiment, error calculation is performed for all channels. However, the target may be limited to some channels. For example, if a background region occupies most of a learning image, only channels representing a character region and a graphic region except the background region are learned. In addition, the error calculation method using the weight image M is not limited to equation (5). For example, the error of each pixel may be calculated by $$d_{ij} = \begin{cases} 0 & (F_{ij}(X;\theta) - Y)^2 - (1 - M_{ij}) < 0 \\ (F_{ij}(X;\theta) - Y)^2 - (1 - M_{ij}) & \text{otherwise} \end{cases} \qquad (6)$$

where i and j indicate the element on the ith column and the jth row of a matrix, and $d_{ij}$ represent the error of each pixel. In equation (6), 1-M (that is, a weight image in which the weight of a boundary region is 1, and the weight of a non-boundary region is 0) is subtracted from the original error, thereby suppressing the error in the boundary region. That is, the error calculation unit 207 suppresses the error in the boundary region using the weight image M and calculates the error.

In step S507, for the model parameter received from the inference unit 206 and the error received from the error calculation unit 207, the model updating unit 208 updates the model parameter such that the result of the loss function becomes small. In this embodiment, the model parameter is updated using, for example, a back propagation method. Also, in step S507, the model storage unit 209 stores, in the HDD 104, the model parameter received from the model updating unit 208. At this time, the model storage unit 209 adds identification information capable of specifying how many times model updating was performed to obtain the stored model parameter. For example, the model storage unit 209 adds a number to the file name to be stored and stores the model parameter.

In step S508, the learning state monitoring unit 210 stores, in the RAM 103, the error received from the error calculation unit 207. At this time, the learning state monitoring unit 210 adds identification information capable of specifying how many times model updating was performed to obtain the stored error. Furthermore, the learning state monitoring unit 210 determines whether to end learning based on the history of errors stored in the RAM 103. More specifically, if the model has been updated a predetermined number of times (Nmax), or the change amount of last N errors is equal to or larger than a predetermined value ($\varepsilon$), it is determined to end learning. In this embodiment, for example, Nmax is 1,000, N is 3, and $\varepsilon$ is 0. In this embodiment, the learning end condition is directly set in the program. However, a setting field may be provided on the application activation screen 401 to allow the user to do the setting. Note that to prevent the model from excessively adapting to learning data and losing flexibility, a part of the learning data may be used in the model updating processing in step S507, and another part of the learning data may be used in the learning end determination in step S508. For example, 80% of learning data is used at random in the model updating processing, and remaining 20% is used in the learning end determination. This makes it possible to evaluate performance for images that are not used in learning. In addition, the error may not be used in determining whether to end learning. For example, the determination may be done only using the model parameter updating count, or an evaluation value (for example, the matching ratio of a classified region) other than the error may be used.

If the learning state monitoring unit 210 determines not to end learning in step S508, processing from step S503 is repeated. In step S503, an input training image and a correct answer training image are generated again, thereby performing learning using images that change in each learning processing. On the other hand, if the learning state monitoring unit 210 determines to end learning in step S508, the learning state monitoring unit 210 specifies, based on the history of errors, the model updating count with the smallest error, and acquires, from the model storage unit 209, a model parameter and a model structure at the time of model updating. The learning state monitoring unit 210 outputs the acquired model structure and model parameter to the model output unit 211, and ends the learning processing. In this embodiment, learning processing of the learning application is performed in the above-described way.

The model learned in this embodiment may be provided, via the data communication unit 108, to an external system that uses the model. For example, the system can use the provided model to convert an image obtained by scanning a print product into an estimated label image. For example, a system that converts a print product into electronic data and manages it can extract only the character region of the scanned image by segmentation and execute OCR (Optical Character Recognition). Also, in a printing system including an inkjet printer, when copying a print product, selecting a print mode in accordance with the print region of a natural image and the print region of a graphic or a character can be implemented.

As described above, according to this embodiment, it is possible to perform learning while suppressing the influence of a label boundary portion at the time of image segmentation learning. More specifically, in this embodiment, a weight image is generated based on the boundary of a label image as a correct answer, thereby suppressing the influence of the boundary portion in error calculation. For this reason, even in segmentation learning of a print product in which the boundary of the label image as a correct answer cannot uniquely be decided, it is possible to appropriately perform learning while controlling the region where an error should be minimized.

Second Embodiment

In the first embodiment, a configuration that suppresses the influence of the boundary portion of a label region in error calculation based on a weight image generated by the weight image generation unit 205 has been described. In the second embodiment, a configuration that suppresses the influence of the boundary portion of a label region in error calculation based on the balance between a boundary region and a non-boundary region will be described. The second embodiment will be described below concerning points different from the first embodiment.

Figure 8:
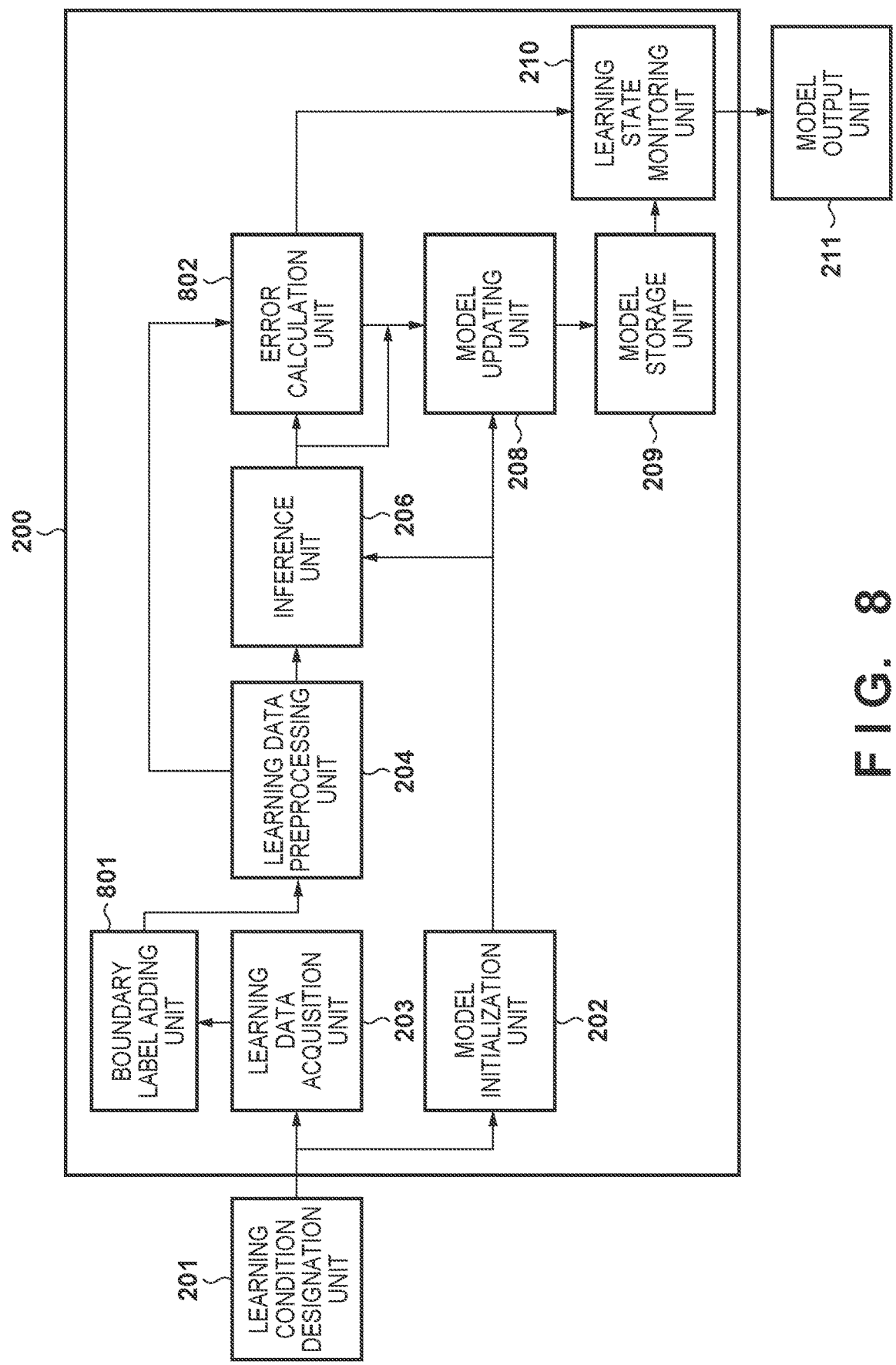
FIG. 8 is a view showing the software configuration of a learning application.

FIG. 8 is a block diagram showing an example of the configuration of software blocks of a learning application according to this embodiment. In this embodiment, a boundary label adding unit 801 is formed between a learning data acquisition unit 203 and a learning data preprocessing unit 204. That is, the boundary label adding unit 801 adds a boundary label to a label image input from the learning data acquisition unit 203, and outputs a learning image and the processed label image to the learning data preprocessing unit 204.

For a correct answer training image input from the learning data preprocessing unit 204 and an estimated label image input from an inference unit 206, an error calculation unit 802 calculates the error between the correct answer training image and the estimated label image. The error calculation unit 802 outputs the calculated error to a model updating unit 208 and a learning state monitoring unit 210.

Figure 9:
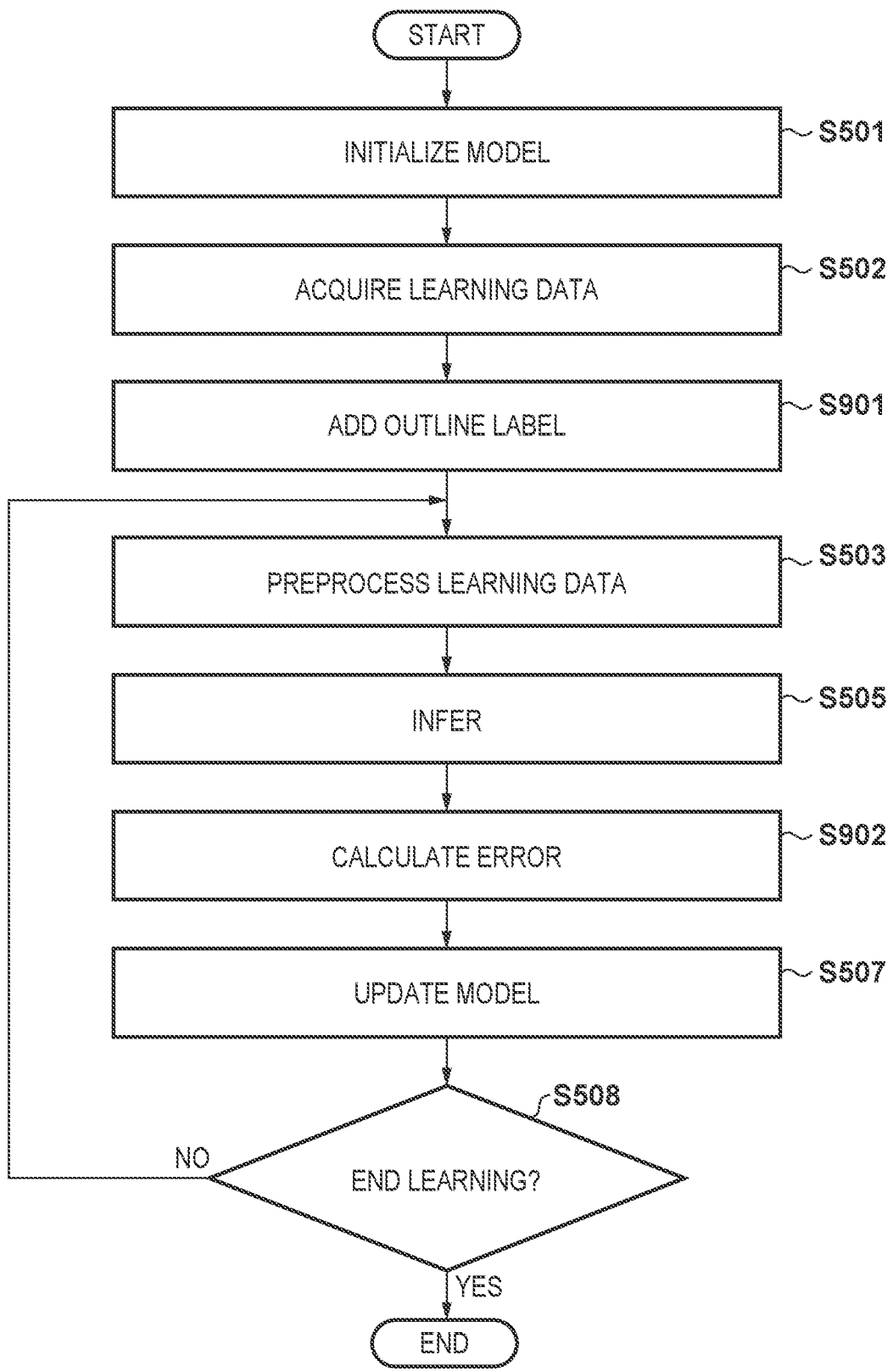
FIG. 9 is a flowchart showing learning processing.

FIG. 9 is a flowchart showing processing of a learning processing unit 200 of the learning application according to this embodiment. Steps S501 and S502 are the same as described in the first embodiment, and a description thereof will be omitted.

After step S502, in step S901, the boundary label adding unit 801 adds a boundary label to the label image received from the learning data acquisition unit 203. The boundary label is a label used to judge whether a pixel of interest belongs to a boundary region by error calculation processing to be described later. A description will be made using an example in which regions are classified into three regions including a background region, a character region, and a graphic region. The label image received from the learning data acquisition unit 203 is a 3-channel image representing whether a certain pixel belongs to each region. The boundary label adding unit 801 first performs boundary extraction processing using a one-dimensional filter or the like for the label image, and determines, on a pixel basis, whether the pixel belongs to the boundary region. Next, the boundary label adding unit 801 extends the label image from 3 channels to 4 channels, and handles the fourth channel as the boundary label. For example, the label values of a pixel, which is determined by the boundary label adding unit 801 to belong to a boundary region, are changed to (0, 0, 0, 1). For a pixel determined to belong to a non-boundary region, the values of the 3 original channels are kept unchanged, and 0 is set for the fourth channel.

After step S901, the processes of steps S503 and S505 are performed. Steps S503 and S505 are the same as described in the first embodiment, and a description thereof will be omitted.

After step S505, in step S902, the error calculation unit 802 calculates an error for the correct answer training image received from the learning data preprocessing unit 204 and the estimated label image received from the inference unit 206. Error calculation performed in this embodiment is formulated by $$L(\theta) = \sum_{i=1}^{C-1} L^{(i)}(\theta) + wL^{(C)}(\theta) \quad (7)$$

$$L^{(l)}(\theta) = \frac{1}{n}\sum_{i=1}^{n} \left\|\left(F^{(l)}(X_i;\theta) - Y_i^{(l)}\right) \circ M_i^{(l)}\right\|_2^2 \quad (8)$$

$$w = \begin{cases} 1 & L^{(C)}(\theta) < \sum_{i=1}^{C-1} L^{(i)}(\theta) \\ \dfrac{\sum_{i=1}^{C-1} L^{(i)}(\theta)}{L^{(C)}(\theta)} & \text{otherwise} \end{cases} \quad (9)$$

where L is a loss function configured to measure an error between an output image output from a CNN and the correct answer training image. $Y_i$ is the ith correct answer training image, $X_i$ is the ith input training image, and $M_i$ is the ith weight image. F is a function that expresses operations (equation (1)) performed in the layers of the CNN together and means inference by the inference unit 206. $\theta$ is a model parameter (a filter and a bias). Also, n is the total number of training images used in learning. C is the number of channels of the label image. Note that (l) on the upper right side of each of the functions L and F represents that these are functions configured to output the lth channel in the label image. The first term of equation (7) represents the error in the non-boundary region, and the second term represents the error in the boundary region.

If the error in the boundary region is smaller than the error in the non-boundary region, by w of equation (9), it becomes equal to the loss function of equation (2). On the other hand, if the error in the boundary region is equal to or larger than the error in the non-boundary region, by w of equation (9), the error in the boundary region is adjusted such that it becomes equal to the error in the non-boundary region. That is, although the weight image is stationarily determined based on the correct answer label image in the first embodiment, in this embodiment, the weight serving as the degree of influence can adaptively be changed depending on the state (ratio) of the error. Hence, control can adaptively be performed in accordance with the stage of learning such that the error in the boundary region is prevented from becoming too large to make the influence of the boundary region on learning dominant.

After step S902, the processes of steps S507 and S508 are performed. Steps S507 and S508 are the same as described in the first embodiment, and a description thereof will be omitted.

As described above, according to this embodiment, it is possible to adjust error calculation based on the balance of errors between the boundary region and the non-boundary region. This can improve the learning efficiency by adaptively suppressing the influence of the boundary region on learning.

Third Embodiment

In the first and second embodiments, a configuration that suppresses the influence of the error in the boundary portion by the loss function has been described. In the third embodiment, a configuration that suppresses the influence of the boundary portion by acting on learning data will be described.

Figure 10:
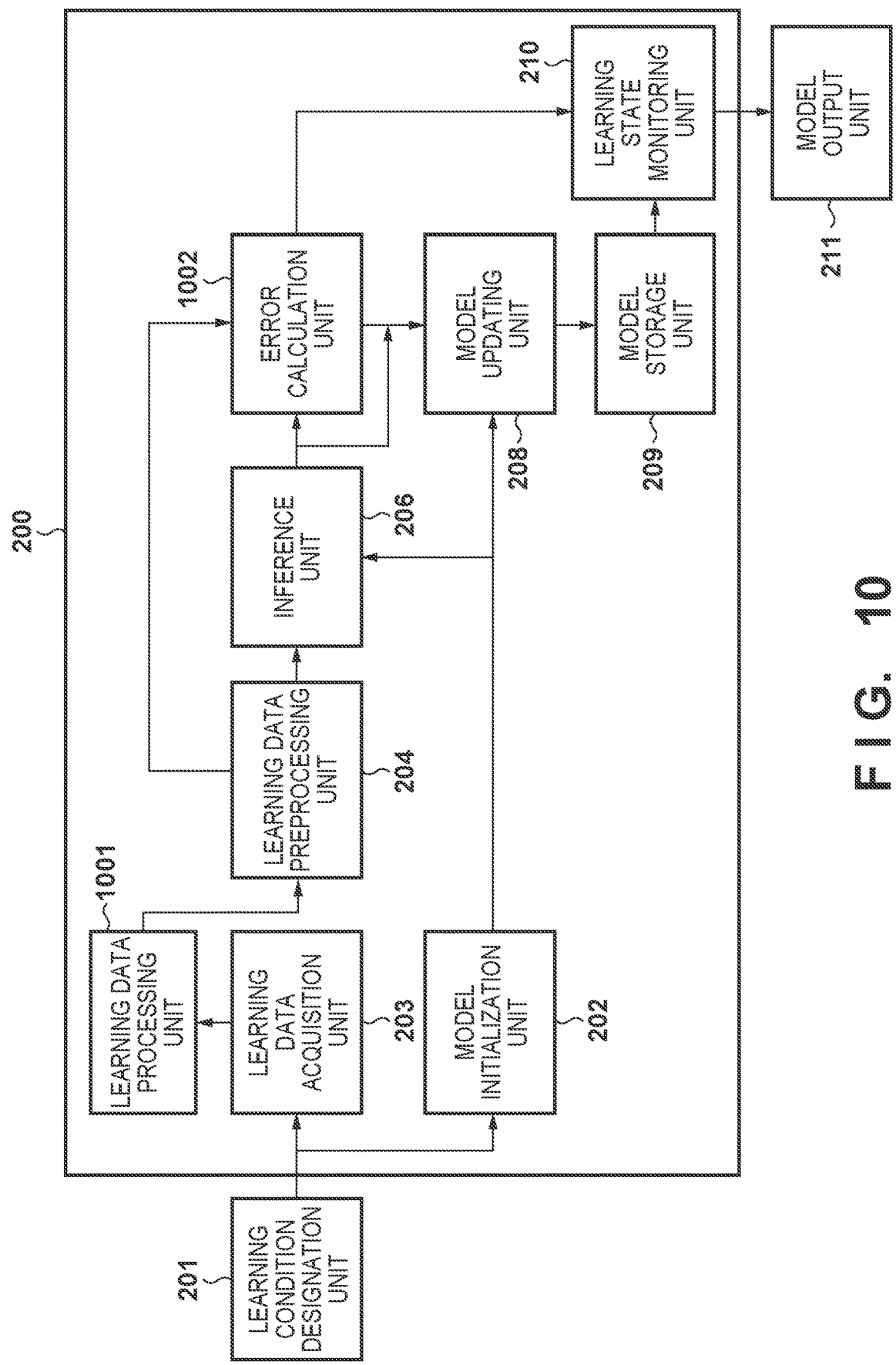
FIG. 10 is a view showing the software configuration of a learning application.

FIG. 10 is a block diagram showing an example of the configuration of software blocks of a learning application according to this embodiment. In this embodiment, a learning data processing unit 1001 is formed between a learning data acquisition unit 203 and a learning data preprocessing unit 204. That is, the learning data processing unit 1001 performs data processing for suppressing an error for a learning image or a label image input from the learning data acquisition unit 203. The learning data processing unit 1001 outputs the processed learning data to the learning data preprocessing unit 204.

For a correct answer training image input from the learning data preprocessing unit 204 and an estimated label image input from an inference unit 206, an error calculation unit 1002 calculates the error between the correct answer training image and the estimated label image. The error calculation unit 1002 outputs the calculated error to a model updating unit 208 and a learning state monitoring unit 210.

Figure 11:
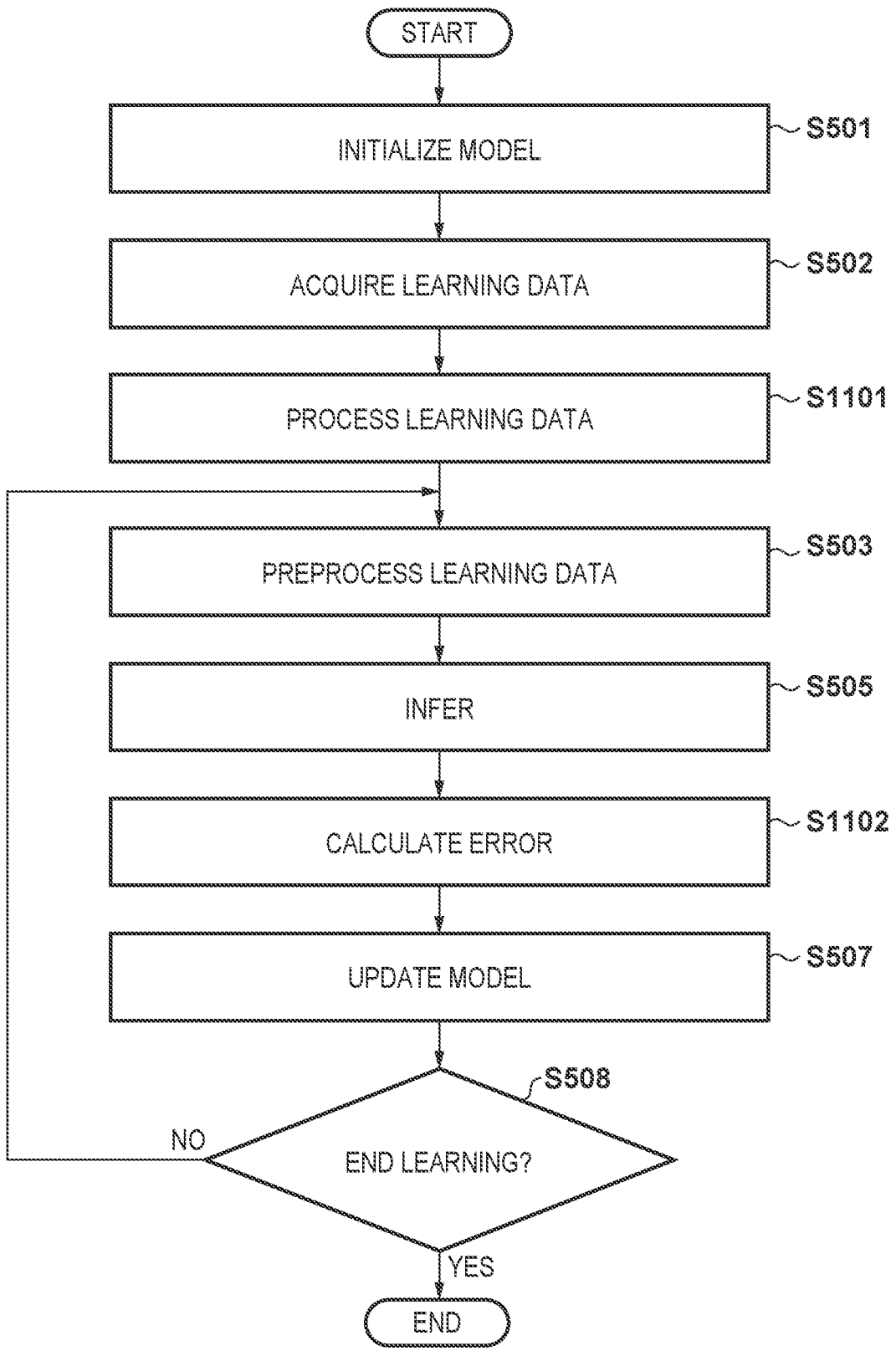
FIG. 11 is a flowchart showing learning processing.

FIG. 11 is a flowchart showing processing of a learning processing unit 200 of the learning application according to this embodiment. Steps S501 and S502 are the same as described in the first embodiment, and a description thereof will be omitted.

After step S502, in step S1101, for the learning image or the label image received from the learning data acquisition unit 203, the learning data processing unit 1001 performs processing for suppressing the influence of a boundary portion on learning. For example, the learning data processing unit 1001 processes the label image in the boundary portion to a probability label. The probability label is a label value representing, by a probability, a label to which a pixel of interest belongs. For example, a pixel that belongs to region 1 at a probability of 20%, to region 2 at 30%, and to region 3 at 50% has a label value (0.2, 0.3, 0.5). In this embodiment, the learning data processing unit 1001 applies a blur kernel to the label image received from the learning data acquisition unit 203, thereby performing smoothing.

FIGS. 12A to 12C are views for explaining an example of data processing performed by the learning data processing unit 1001. FIG. 12A shows an example of the blur kernel used in this embodiment. FIG. 12B shows an example of a 3-channel label image received from the learning data acquisition unit 203. FIG. 12C shows an example in which the blur kernel shown in FIG. 12A is convolved in each channel of the label image shown in FIG. 12B. In the label image shown in FIG. 12B, the pixels of two left columns and the pixels of two right columns belong to different regions. In the label image shown in FIG. 12C after processing, the pixels in the boundary portion are processed to a probability label by smoothing.

Note that in this embodiment, a box blur of 3 px×3 px is used. However, the present invention is not limited to this. For example, a Gaussian blur may be used. Alternatively, the region may be extended by expansion processing in each channel, and normalization is performed for each pixel after the region is extended to obtain a probability label. The data processing method is not limited to conversion to the probability label, and reducing the influence of the error in the boundary region suffices. For example, the learning image and the label image may be reduced. As described with reference to FIG. 6, the factor to cause the error in the boundary region is fine unevenness at the boundary or a blur in scanning. The influence can be reduced by reducing the image. That is, although the accuracy of local segmentation is lowered by reducing the whole image, global segmentation can effectively be learned. Also, in this embodiment, learning data is processed by the learning data processing unit 1001. However, the present invention is not limited to this. For example, a learning apparatus 100 may not include the learning data processing unit 1001 and may hold, in an HDD 104, learning data processed by an external apparatus.

After step S1101, the processes of steps S503 and S505 are performed. Steps S503 and S505 are the same as described in the first embodiment, and a description thereof will be omitted.

After step S505, in step S1102, the error calculation unit 1002 calculates an error for the correct answer training image received from the learning data preprocessing unit 204 and the estimated label image received from the inference unit 206. Error calculation performed in this embodiment complies with equation (2). For example, assume that a pixel 1201 and a pixel 1202 are erroneously estimated to an estimated label (0, 1, 0). In this case, the error between the estimated label and the pixel 1201 as the label before processing is given by $$|0-1|^2+|1-0|^2=2 \qquad (10)$$

On the other hand, the error between the estimated label and the pixel 1202 as the label after processing is given by $$\left|0-\frac{2}{3}\right|^2+\left|1-\frac{1}{3}\right|^2=\frac{8}{9} \qquad (11)$$

As can be seen from the fact that the error of equation (11) is smaller than the error of equation (10), the maximum error in wrong estimation is made small by processing the correct answer label. It is therefore possible to reduce the influence of the error in the boundary portion. Also, since error calculation can be executed by general processing, it is particularly effective when applied to an existing learning apparatus.

After step S1102, the processes of steps S507 and S508 are performed. Steps S507 and S508 are the same as described in the first embodiment, and a description thereof will be omitted.

As described above, according to this embodiment, it is possible to reduce the influence of the error on learning in the boundary region by processing learning data. This can suppress the influence of the error by only preprocessing of learning data.

In each embodiment, a processor or a circuit can include a central processing unit (CPU), a microprocessing unit (MPU), a graphics processing unit (GPU), an application specific integrated circuit (ASIC), or a field programmable gateway (FPGA). In addition, a processor or a circuit can include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-107823, filed Jun. 29, 2021, which is hereby incorporated by reference herein in its entirety.

What is claimed is:

1. An information processing apparatus comprising:
an acquisition unit configured to acquire a set of image data and label data serving as correct answer data and representing, as a label value, a region to which a pixel of the image data belongs;
an estimation unit configured to estimate, from the image data, a region to which each pixel of the image data belongs using a learning model;
a calculation unit configured to calculate an error between the label data and an estimation result by the estimation unit;
an updating unit configured to update the learning model based on the error calculated by the calculation unit, and
a control unit,
wherein the calculation unit calculates a first error for a boundary region of an image represented by the image data, calculates a second error for a non-boundary region different from the boundary region, and calculates the error between the label data and the estimation result based on the first error and the second error, and
the control unit is configured to perform control such that an influence of the first error on the calculation by the calculation unit is smaller than an influence of the second error on the calculation by the calculation unit.

2. The apparatus according to claim 1, further comprising a second acquisition unit configured to acquire a first weight corresponding to the boundary region and a second weight corresponding to the non-boundary region,
wherein the calculation unit calculates the error between the label data and the estimation result by applying the first weight to the first error and applying the second weight to the second error, and
the first weight is smaller than the second weight.

3. The apparatus according to claim 2, wherein the second acquisition unit acquires the first weight and the second weight based on data obtained by applying a first-order differential filter to the label data.

4. The apparatus according to claim 1, further comprising a third acquisition unit configured to acquire a weight corresponding to the boundary region,
wherein the calculation unit calculates the error between the label data and the estimation result by applying the weight to the first error, and
the influence of the first error on the calculation by the calculation unit is controlled by the weight to be smaller than the influence of the second error on the calculation by the calculation unit.

5. The apparatus according to claim 4, wherein the third acquisition unit acquires a ratio of the first error to the second error as the weight.

6. The apparatus according to claim 5, wherein as the first error becomes larger than the second error, the weight becomes smaller.

7. The apparatus according to claim 1, further comprising a change unit configured to change the label value of the boundary region represented by the label data,
wherein the calculation unit calculates the error between the label data and the estimation result using the label value changed by the change unit.

8. The apparatus according to claim 7, wherein the change unit changes the label value of the boundary region such that the label value represents probability that the region is the boundary region and probability that the region is the non-boundary region.

9. The apparatus according to claim 8, wherein the change unit changes the label value of the boundary region using a blur kernel.

10. The apparatus according to claim 1, wherein the learning model updated by the updating unit is a learning model to be used for segmentation of an image.

11. An information processing method comprising:
acquiring a set of image data and label data serving as correct answer data and representing, as a label value, a region to which a pixel of the image data belongs;
estimating, from the image data, a region to which each pixel of the image data belongs using a learning model;
calculating an error between the label data and an estimation result in the estimating; and
updating the learning model based on the calculated error,
wherein a first error is calculated for a boundary region of an image represented by the image data, a second error is calculated for a non-boundary region different from the boundary region, and the error between the label data and the estimation result is calculated based on the first error and the second error, and
an influence of the first error on the calculation in the calculating is controlled to be smaller than an influence of the second error on the calculation in the calculating.

12. The method according to claim 11, further comprising acquiring a first weight corresponding to the boundary region and a second weight corresponding to the non-boundary region, wherein the error between the label data and the estimation result is calculated by applying the first weight to the first error and applying the second weight to the second error, and the first weight is smaller than the second weight.

13. The method according to claim 11, further comprising acquiring a weight corresponding to the boundary region, wherein the error between the label data and the estimation result is calculated by applying the weight to the first error, and the influence of the first error on the calculation is controlled by the weight to be smaller than the influence of the second error on the calculation.

14. A non-transitory computer-readable storage medium storing a program configured to cause a computer to function to:

acquire a set of image data and label data serving as correct answer data and representing, as a label value, a region to which a pixel of the image data belongs;

estimate, from the image data, a region to which each pixel of the image data belongs using a learning model;

calculate an error between the label data and an estimation result in the estimating; and update the learning model based on the calculated error, wherein a first error is calculated for a boundary region of an image represented by the image data, a second error is calculated for a non-boundary region different from the boundary region, and the error between the label data and the estimation result is calculated based on the first error and the second error, and an influence of the first error on the calculation in the calculating is controlled to be smaller than an influence of the second error on the calculation in the calculating.

15. The storage medium according to claim 14, wherein the computer is further caused to acquire a first weight corresponding to the boundary region and a second weight corresponding to the non-boundary region, the error between the label data and the estimation result is calculated by applying the first weight to the first error and applying the second weight to the second error, and the first weight is smaller than the second weight.

16. The storage medium according to claim 14, wherein the computer is further caused to acquire a weight corresponding to the boundary region, the error between the label data and the estimation result is calculated by applying the weight to the first error, and the influence of the first error on the calculation is controlled by the weight to be smaller than the influence of the second error on the calculation.

17. The storage medium according to claim 14, wherein the program is configured to cause the computer to further function to update a parameter of the learning model such that an error becomes smaller.

18. A system including a server and an image processing apparatus, wherein the server comprises:

an acquisition unit configured to acquire a set of image data and label data serving as correct answer data and representing, as a label value, a region to which a pixel of the image data belongs;

an estimation unit configured to estimate, from the image data, a region to which each pixel of the image data belongs using a learning model;

a calculation unit configured to calculate an error between the label data and an estimation result by the estimation unit;

an updating unit configured to update the learning model based on the error calculated by the calculation unit; and a transmission unit configured to transmit the learning model updated by the updating unit to the image processing apparatus, the image processing apparatus comprises an image processing unit configured to execute image processing using the learning model transmitted by the transmission unit, the calculation unit calculates a first error for a boundary region of an image represented by the image data, calculates a second error for a non-boundary region different from the boundary region, and calculates the error between the label data and the estimation result based on the first error and the second error, and an influence of the first error on the calculation by the calculation unit is controlled to be smaller than an influence of the second error on the calculation by the calculation unit.

19. The system according to claim 18, further comprising a second acquisition unit configured to acquire a first weight corresponding to the boundary region and a second weight corresponding to the non-boundary region, wherein the calculation unit calculates the error between the label data and the estimation result by applying the first weight to the first error and applying the second weight to the second error, and the first weight is smaller than the second weight.

20. The system according to claim 18, further comprising a third acquisition unit configured to acquire a weight corresponding to the boundary region, wherein the calculation unit calculates the error between the label data and the estimation result by applying the weight to the first error, and the influence of the first error on the calculation by the calculation unit is controlled by the weight to be smaller than the influence of the second error on the calculation by the calculation unit.

* * * * *